United States Patent [19]

Tydeman

[11] Patent Number: 5,207,444
[45] Date of Patent: May 4, 1993

[54] TURNTABLE FOR STEERABLE TRAILERS

[76] Inventor: Robert E. Tydeman, 7878 SW. Peters Rd., Tigard, Oreg. 97224

[21] Appl. No.: 749,345

[22] Filed: Aug. 23, 1991

[51] Int. Cl.$^5$ .............................................. B62D 53/08
[52] U.S. Cl. .................................... 280/441.1; 280/433
[58] Field of Search ...................... 280/433, 441.1, 404, 280/408, 419, 442, 656, 789; 105/4.4, 175.1, 182.1, 190.1

[56] References Cited

U.S. PATENT DOCUMENTS

| | | | |
|---|---|---|---|
| 3,096,099 | 7/1963 | Bowles et al. | 280/433 |
| 3,245,732 | 4/1966 | Standing et al. | 280/433 |
| 4,898,399 | 2/1990 | Adams | 280/433 X |
| 4,988,115 | 1/1991 | Steinke | 280/442 X |
| 5,066,035 | 11/1991 | Athans et al. | 280/441.1 |

Primary Examiner—Margaret A. Focarino
Assistant Examiner—Carla Mattix
Attorney, Agent, or Firm—Olson & Olson

[57] ABSTRACT

A steering turntable for the front wheel assembly of trailers and the like is formed of first and second turntable ring members each having cooperating projecting circular wall sections configured to interconnect with each other to prevent separation of the ring members from each other while allowing relative rotation of the ring members. A plastic ring of ultra high molecular weight synthetic resin, such as polyurethane, is interposed between the bearing surfaces of the first and second rings to provide a reduced-friction bearing surface therebetween.

8 Claims, 1 Drawing Sheet

TURNTABLE FOR STEERABLE TRAILERS

BACKGROUND OF THE PRIOR ART

This invention relates to commercial truck trailers and the like, and more particularly to such trailers that incorporate steerable front wheel assemblies mounted on the trailer frame by a turntable apparatus.

In order to better distinguish the particular environment involved in the present invention, conventional commercial truck trailers commonly seen on highways may be divided into two broad categories: Those having wheel-bearing rear axles and a front fifth wheel-type hitch arrangement, and those trailers which are supported both in the front and rear by their own wheel-bearing axle assemblies. The former category usually finds the trailer connected directly to the tractor rig, or alternatively, the front end of the trailer is supported on a wheeled dolly which itself mounts the corresponding "horse-shoe" component of a fifth wheel hitch. In both of these cases, steering of the trailer is accomplished by the normal rotational pivoting of the fifth wheel components relative to each other as is well understood in the art.

It is the second category identified above that relates to the present invention. In these trailer constructions, most often seen in very heavy tanker trailers, platform flatbed trailers, log hauling trailers, and other types of trailers, single and dual axle assemblies are mounted on the trailer, both front and rear, making the trailer entirely self-supported on the road. Typically, the rear axles, of course, are mounted in a fixed, straight-forward orientation. However, even a novice will recognize that if the front wheels of the trailer were similarly fixed in a straightforward orientation, the trailer would not be steerable, and would only be able to go straight-forward unless the front end of the trailer were literally dragged around a turn by the pull of the preceeding vehicle or trainer. Accordingly, these trailers have included separate carriage assemblies that mount the front axles and suspension, the carriage mounted to the trailer frame through a very heavy-duty turntable which permits rotation of the front carriage relative to the trailer frame.

These turntable assemblies are known in the art, as illustrated in U.S. Pat. Nos. 2,588,078 and 3,096,099 and shown in a 1983 sales publication by Fab Tek Incorporated. These constructions, which are subject to extremely heavy, vigorous and constant use, have necessarily involved very substantial, structurally complex, cast steel assemblies that require extensive machining and fabrication in manufacture and assembly, and consequently are difficult to maintain and repair. As a result, manufacturing costs are high, and high upkeep time and costs often promote lack of proper maintenance and repair.

SUMMARY OF THE INVENTION

In its basic concept, this invention provides a front steering turntable for trailer wheel-assembly carriages, the turntable comprising an upper ring of extruded aluminum having an annular flange member configured to interlock with the corresponding annular flange member of a lower ring of extruded aluminum for relative rotation of one ring to the other, a plastic bearing ring of ultra-high molecular weight composition interposed between the upper and lower rings to provide a reduced friction bearing surface therebetween, the upper and lower rings configured for mounting to the trailer frame and the front axle carriage respectively of a trailer or the like.

It is by virtue of the foregoing basic concept that the principal objective of this invention is achieved; namely, the provision of a steering turntable for trailers that is of greatly simplified construction, whereby to overcome the disadvantages and limitations of trailer steering turntables of the prior art.

Another object of this invention is the provision of a trailer steering turntable of the class described which is significantly lighter in overall weight, whereby to reduce associated non-essential fuel costs of operating the vehicles.

Another object of this invention is the provision of a trailer steering turntable of the class described which requires a minimum of parts, whereby to reduce manufacturing and maintenance requirements and to facilitate repair and routine upkeep.

Still another object of this invention is the provision of a trailer steering turntable of the class described which is of simplified construction for economical manufacture.

The foregoing and other objects and advantages of this invention will appear from the following detailed description, taken in connection with the accompanying drawings of a preferred embodiment.

DESCRIPTION OF THE PREFERRED EMBODIMENT

Figure 1:
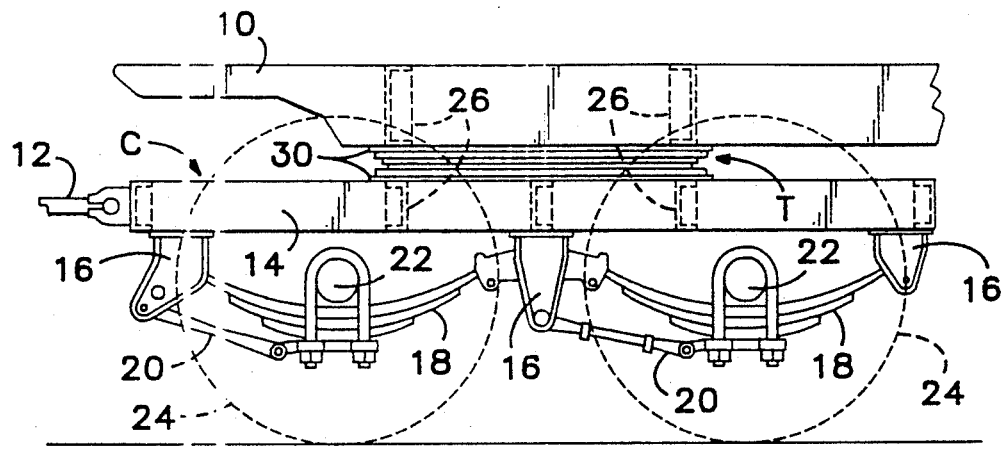
FIG. 1 is a fragmentary side elevation of the front end of a conventional trailer mounting a steering turntable assembly between its frame rails and its wheel-mounting axle/suspension carriage, the wheels being shown in broken lines in order to permit a view of structure otherwise hidden from view.

FIG. 1 illustrates a side view of the front end of a conventional trailer frame having a pair of longitudinally extending, parallel frame rails 10 supporting a conventional steerable front wheel carriage C through a steering turntable T. For purposes of illustration, the front wheel carriage C shown mounts a conventional dual axle and suspension assembly and a typical drawbar 12 which hitches at its opposite end to the rear of a towing vehicle or trailer.

The steering carriage C includes a frame structure 14, suspension spring mounts 16, leaf springs 18, stabilizers 20, axles 22 and wheels 24. Typically, both the trailer frame rails 10 and the carriage frame rails 14 mount laterally extending transverse cross members 26 for strength and stability. It is to be understood that, although a dual axle front steering assembly is shown in FIG. 1, a single front axle steering assembly may alternatively be provided as well.

Also typical of such turntable constructions, the turntable assemblies themselves generally comprise upper and lower circular ring members relatively rotatable one to the other, which are typically removably mounted, as by bolts 28 to steel plates 30 either permanently or removably mounted securely to the frame rails 10, 14 of the trailer frame and carriage frame respectively. Circumferential bores 28' are typically provided through the ring members and the steel mounting plates at regularly spaced intervals for the passage of the mounting bolts 28.

Figure 2:
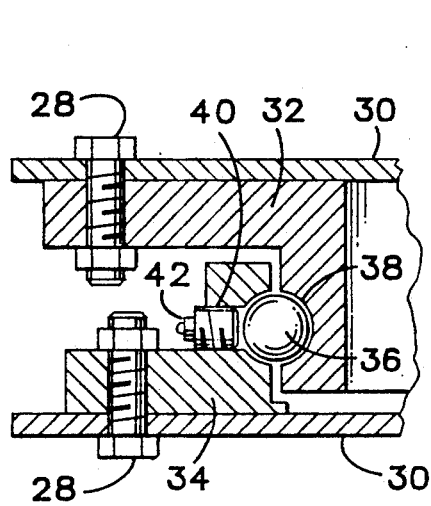
FIG. 2 is a fragmentary, sectional view taken through a conventional trailer steering turntable assembly currently available in the marketplace.

Referring to FIG. 2 of the drawings, there is shown an example of the heretofore typical turntable construction provided in the art. These very heavy duty constructions typically have provided an upper ring member 32 of cast or forged steel configured, as shown, as a circular member having an L-shaped cross section, cooperating with a similarly configured lower ring member 34. The upper and lower ring members 32, 34 are coupled together by ball bearings 36 captured in bearing raceways 38 machined into the steel ring member casting. Once the ring members are assembled, the ball bearings are inserted into the raceway through a hole 40 drilled through the projecting leg of the lower ring member 34, and the hole is then closed by a plug or a grease fitting 42 as shown. The manufacturing and assembly complexity of these constructions have resulted in necessarily high costs involved.

Figure 3:
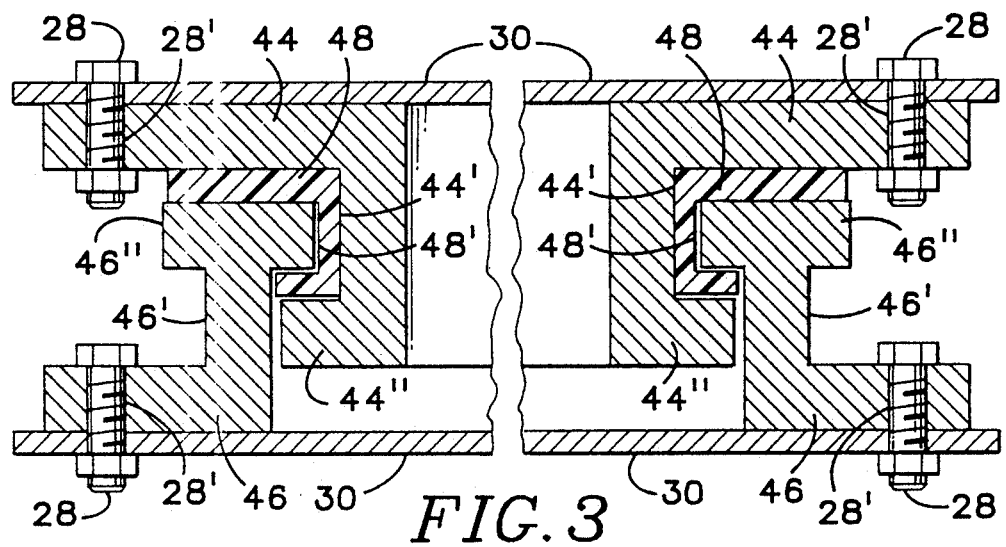
FIG. 3 is a foreshortened, fragmentary sectional view taken through a turntable embodying the features of this invention.

The internal structural features of the improved turntable construction of my invention are seen in FIG. 3 of the drawings. In the embodiment illustrated, the turntable comprises an upper turntable ring member 44 configured to rotatably interlock with a lower turntable ring member 46, there being a plastic bearing ring 48 preferably of ultra high molecular weight synthetic resin, such as high density polyurethane, interposed therebetween to provide a reduced-friction bearing surface between the cooperating ring members for their relative rotation one to the other.

Referring to the ring members 44, 46, while they may be provided as castings and forgings if desired for certain uses and objectives, it is preferred that they be provided of extruded aluminum which is then processed from a linear shape to a circular shape. As illustrated, the upper ring 44 is configured to be substantially J-shaped in cross section, defining an outwardly facing annular groove 44' and lock section 44". The lower ring member 46 is configured to be substantially L-shaped in cross section. The inner wall section is designated 46' and a lock section 46", as shown.

As is evident in viewing FIG. 3, the J-shape configuration of the upper ring forms an outwardly facing annular groove 44' which carries the plastic bearing ring 48 as shown. This bearing ring is captured freely within the confines of the groove 44' provided in the upper ring. As illustrated, the bearing ring, also configured to be substantially J-shape in cross section, defines a second outwardly facing annular groove 48' which captures the projecting portion of the lock section 46" of the lower ring member. In this manner, the upper and lower ring members are positively interlocked against separation from each other and yet are free to rotate relative to each other.

Figure 4:
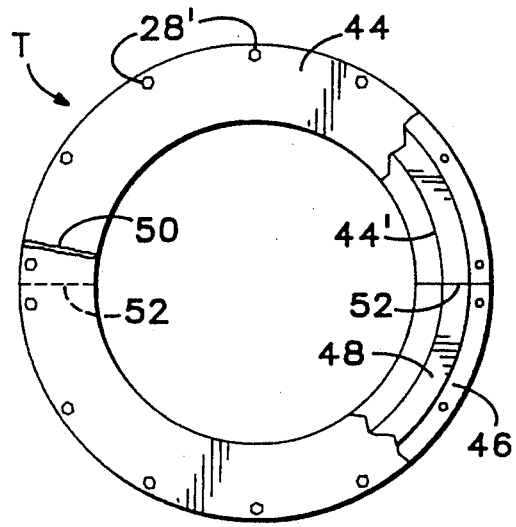
FIG. 4 is a top plan view of the turntable of this invention, a portion of the top ring member being broken away to show internal detail.

Since it is the cooperating configurations of the upper and lower ring members themselves that provides means by which the ring members are interlocked together, it is clear that the assembling of the upper and lower ring members would be impossible if both ring members were provided as one-piece, circular units. Therefore, in my construction I prefer to provide one ring member, the upper ring member 44 in this embodiment as a one-piece circular member and the lower ring member 46 in two semi-circular sections which may be fitted onto the upper ring member one section at a time. In this, FIG. 4 illustrates that the upper ring member, when formed as an extrusion that is processed into circular shape, has its terminal ends secured together as by weld 50, thereby forming a complete circular unit. The terminal ends of the semi-circular lower ring sections are shown at 52. The sections are secured in the circular condition interlocked with the upper ring by virtue of their attachment to the steel plate member 30 secured to the wheel assembly carriage C. Alternatively of course, the abutting ends of the ring sections may be welded together directly to form a single ring member.

Accordingly, manufacture of the turntable of this invention simply involves extruding the upper ring and processing it into circular shape when securing its terminal ends together to form a ring unit; extruding and forming a plastic bearing ring either as a unit or in sections and mounting it in the circumferential groove of the upper ring member; and extruding a lower ring in semi-circular sections, or in more than two arcuate segments which together form a circular ring member.

Assembly of a working turntable of this invention simply involves mounting the upper ring 44 to a plate member; fitting the bearing ring 48 into the annular groove 44' fitting the locking sections 46" of the lower ring sections 46 into the circumferential groove 48' of the upper ring and securing the lower ring sections to a plate member 30. The completed turntable assembly is then mounted in position between a trailer frame and its front wheel steering carriage by securing the plates 30 to their respective frame members, as by the bolts 28 shown in FIG. 3.

From the foregoing it will be apparent to those skilled in the art that the present invention provides a greatly improved turntable construction which benefits by its simplicity of manufacture and assembly, its elimination of heretofore necessary mechanical and moving structural parts, and by its significantly reduced weight. Also it will be apparent to those skilled in the art that various changes in the size, shape, type, number and arrangement of parts described hereinbefore may be made without departing from the spirit of this invention and the scope of the appended claims.

Having thus described my invention and the manner in which it is used, I claim:

1. A turntable apparatus comprising:
 a) a first turntable ring member having an outwardly facing annular groove,
 b) a plastic bearing ring captured in the annular groove of said first turntable ring member and having an outwardly facing annular groove, and
 c) a second turntable ring member having an inwardly extending, peripheral locking section captured within the annular groove of said bearing ring for securing said first and second ring members together for relative rotation.

2. The turntable apparatus of claim 1 wherein said plastic bearing ring is formed of ultra high molecular weight synthetic resin.

3. The turntable of claim 1 wherein said first ring member is formed of extruded aluminum and processed into circular configuration, and said second ring member is formed of extruded aluminum processed into at least two arcuate sections together forming a circular ring member, and securing means engages said arcuate sections to secure them together in circular orientation with said peripheral locking section engaged in the annular groove in the bearing ring.

4. The turntable of claim 3 wherein the plastic bearing ring is formed of extruded ultra high molecular weight synthetic resin.

5. The turntable apparatus of claim 4 wherein one of said first and second ring members is configured for mounting centrally to the frame rails of a trailer, and the other ring member is configured for mounting centrally to the steering carriage of a trailer.

6. A turntable apparatus comprising:
 a) a circular first turntable ring member having projecting circular wall sections together forming a substantially J-shape cross section defining an outwardly facing annular groove,
 b) a circular plastic bearing ring captured within the annular groove of the first turntable ring member and forming an outwardly facing annular groove, and
 c) a second turntable ring member formed in at least two arcuate sections which together form a circular ring member, the second turntable ring member having a circumferential locking section configured to be captured slidably within the confines of the annular groove in said bearing ring, for relative rotation of said first and second turntable ring members.

7. The turntable apparatus of claim 6 wherein said plastic bearing ring is formed of ultra high molecular weight synthetic resin.

8. The turntable apparatus of claim 7 wherein one of said first and second turntable ring members is configured for mounting centrally on the frame rails of a trailer, and the other ring member is configured for mounting centrally on the steering carriage of a trailer.

* * * * *